(No Model.)
G. W. BEMIS, Sr., & T. BEMIS.
CAR AXLE BOX.
No. 318,855. Patented May 26, 1885.
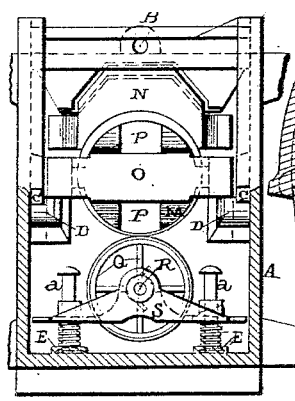
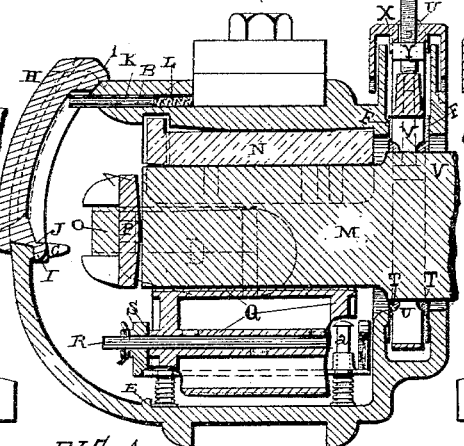
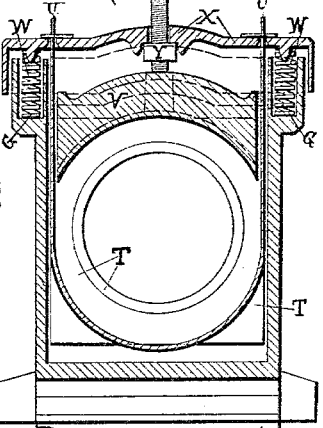
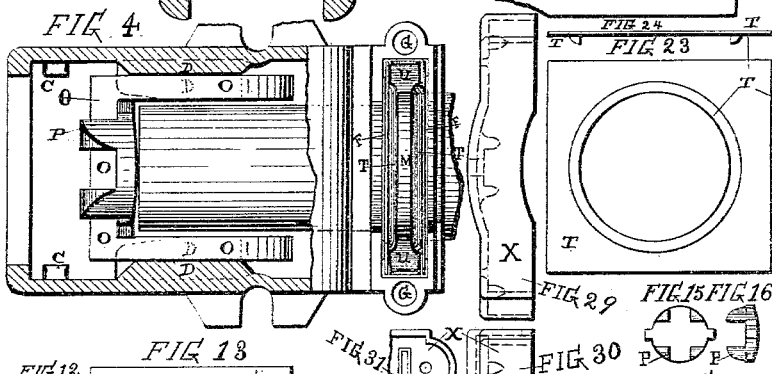
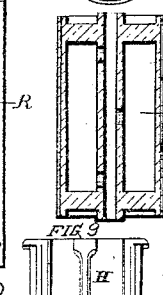
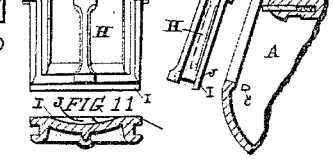
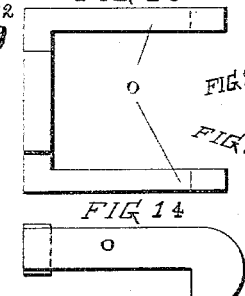
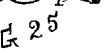
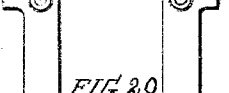
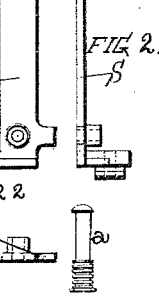
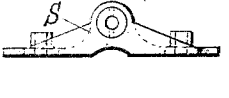
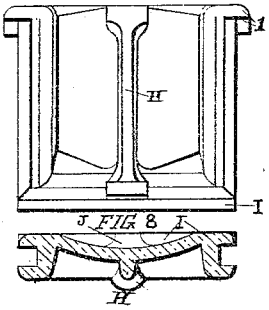
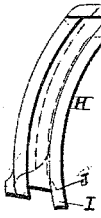
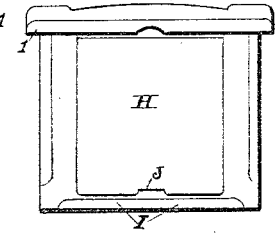
WITNESSES
John W. Roberts
Geo. A. Roberts
INVENTORS,
Geo. W. Bemis, Sr.
Thos. Bemis.

UNITED STATES PATENT OFFICE.

GEORGE W. BEMIS, SR., AND THOMAS BEMIS, OF CINCINNATI, OHIO, ASSIGNORS OF ONE-THIRD TO JNO. W. ROBERTS, OF INDIANAPOLIS, IND.

CAR-AXLE BOX.

SPECIFICATION forming part of Letters Patent No. 318,855, dated May 26, 1885.

Application filed March 24, 1885. (No model.)

*To all whom it may concern:*

Be it known that we, GEORGE W. BEMIS, Sr., and THOMAS BEMIS, of Cincinnati, in the county of Hamilton and State of Ohio, have invented certain new and useful Improvements in Car-Axle Boxes; and we do hereby declare the following to be a full, clear, and exact description of the invention, such as will enable others skilled in the art to which it pertains to make and use it, reference being had to the accompanying drawings, which form part of this specification.

Our invention relates to an improvement in car-axle boxes; and it consists in, first, the combination of the axle-box with a door which is provided with flanges upon its inner and outer edges upon two of its sides and its lower edge, and which flanges catch over the edges of the box, so as to produce an oil-tight, dust and water proof door or cover for the front end of the axle-box; second, the combination of the axle-box having suitable shoulders upon its inner sides with a stirrup which catches over these shoulders, and a piece which is held in position by the stirrup for the end of the axle to bear against; third, the combination of the axle-box, the axle-packing plates, and a band which is placed between the plates, a cover for the top of the packing-chamber, a set-screw, a gland, and keys for locking the top of the chamber and the band together; fourth, in the arrangement and combination of parts, which will be more fully described hereinafter.

Figure 1 is a longitudinal vertical section of a box embodying my invention. Fig. 2 is a view of the outer end of the box with the cover removed and a portion of the box cut away so as to show the arrangement of the different parts. Fig. 3 is a vertical section of the box, taken through the packing-chamber at its inner end. Fig. 4 is a plan view of the box, a portion being removed. Figs. 5, 6, 7, and 8 are detail views of a grooved door. Figs. 9, 10, and 11 are similar views of a straight door. Fig. 12 is a detail view of the outer end of the box made to receive a straight door. Figs. 13 and 14 are plan and side views of the stirrup. Figs. 15 and 16 are detail views of the stop-piece. Figs. 17, 18, and 19 are detail views of the roller and axle. Figs. 20, 21, and 22 are detail views of the roller-frame. Figs. 23 and 24 are detail views of the packing-plates. Figs. 25 and 26 are detail views of the packing-band. Figs. 27 and 28 are detail views of the gland. Figs. 29, 30, and 31 are detail views of the cover of the packing-chamber.

A represents the axle-box, which is preferably made in the shape here shown, and which will have its outer ends either made straight or curved, as may be preferred. Upon this outer end is placed the door H, which will be made either straight or curved, according to the shape of the box, and which has three of its edges grooved, as shown, so as to catch over the edges of the box. The flanges of the inner edges catch over the inner sides of the box, and the flanges upon the outer edges catch over the outer edges of the box, and thus form a dust, water, and oil proof cover. Upon the lower inner edge of the door is formed an independent flange, I, which serves to catch the lubricant which is thrown up and return it back into the box, instead of having it leak out between the edge of the box and the lower edge of the door, as would be the case if this flange were not used. Formed inside of the box are the lugs or projections C, which serve to catch against opposite edges of the door, and thus force this lower flange, I, tightly against the inner edge of the box, so as to make an absolutely oil-tight joint. This door H is so designed that, closing down on the inside of the box A and being wedged forward by the braces C C against the inside edge of the bottom cross-wall of aperture, the lower edge of the door forms a returning-surface to the lubricant splashed against it by the end motion of axle. This is an important feature not possessed by other axle-boxes where the bottom inside edge of the door closing down on the outside of axle-box allows the door-sill to catch the oil and escape between the door and front face of axle-box.

Upon the top edge of the door is formed the flange 1, which catches over the top of the box and forms a tight joint at this point.

On the top center of I is formed a square shoulder, J, which serves as a stop for the pin K to strike against and thus prevent the door from being removed from the box and lost.

This pin K is placed in a hole, B, which is made in the top of the box, and which pin is then held pressed outward against the inner side of the door by means of the spring L. Upon the center of the outside of the door is formed the flange 5, which serves to brace and strengthen the door.

Formed upon the inner opposite sides of the box are the shoulders D, over which the hooked ends of the stirrup O are made to catch. Passed over the center of the outer end of the stirrup is the stop-piece P, against which the inner end of the axle M abuts for the purpose of preventing any lateral motion of the axle, and which takes up the end wear of the same by placing thin plates between the parts O and P.

Placed in the bottom of the box is the frame S, in which is journaled a roller, Q, upon the axle R. This frame S is placed upon the four standards or supports $a$, which pass up through its corners, and around each one of which supports is placed a spiral spring for the purpose of keeping the roller pressed against the under side of the axle, and thus causing the roller to revolve with it. This roller consists of a wooden roller or metallic shell, which revolves in the lubricant, and which serves to feed this lubricant against the axle as it revolves and thus keep the axle constantly lubricated. The roller may be covered with asbestus or other material to increase its oil-lifting capacity. By placing the frame upon springs, as here shown, the roller is made to follow the axle under all circumstances, and thus keep the roller pressed tightly against it.

In order to prevent the frame S from moving back and forth upon the bottom of the box, a suitable stop, E, is formed for each one of the two outer supports, and which stops, by catching against the lower outer edges of the supports, prevent them from moving outward.

Placed upon the top of the axle is the usual brass, N.

In the inner end of the box A is made a packing-chamber of suitable width, and in which chamber are placed the two thin packing-plates T, each having openings through their centers, and which snugly fit against the axle for the purpose of forming a tight joint at this point. These plates T may be thickened and strengthened around the edges of the openings through which the axle passes.

In between these packing-plates T is passed the packing-band U, which serves to support in position all the packing material which is placed between the packing-plates T, and thus hold it in position to be pressed tightly against the axle. The upper ends of this packing-band U pass up through suitable openings made in the cover X of this packing-chamber, and through the projecting ends are then passed suitable pins for the purpose of supporting the band in position upon the cover.

In opposite corners of the box A are formed suitable chambers, G, in which are placed the spiral springs W, which have their upper ends bear against the inner sides of the ends of the cover X, and thus support the cover in position. In order to center these springs and help hold the cover in place, suitable projections are formed on the under side of the cover, so as to catch in the spring, as shown in Fig. 3.

Passed down through the center of the cover X is a set-screw, Y, which passes through a suitable nut on its lower end, and which screw bears against the top of the gland V. This gland rests upon the top of the packing material, of whatever kind, and forces it downward upon the top of the axle at the same time that the packing-band U forces the packing up from below so as to bear against the under side of the axle. This packing material, of whatever kind, being saturated with the lubricant is thus held pressed tightly against the axle, and when it becomes worn it is only necessary to tighten up upon the screw Y, when the wear will be taken up.

In order to prevent any of the lubricant from leaking out through the box the plates T are forced tightly against the opposite sides of the chamber, which have the bearing-flanges F formed upon them by the pressure of the packing material between the glands V and the packing-band U. By this construction the box is rendered oil and dust proof at this point.

Having thus described our invention, we claim—

1. The combination of the box with the sliding door H, which is grooved upon its sides and lower edges and provided with the flange I, which catches inside of the box, substantially as described.

2. The combination of the axle-box with the sliding door, which is grooved and provided with flanges, and the studs or projecsions C upon the inner side of the box, to force the lower flange, I, upon the door tightly against the inner side of the box, substantially as set forth.

3. The combination of the box A, provided with shoulders D, the stirrup O, the end bearing-piece, P, and the axle, substantially as set forth.

4. The combination of the box, the axle, the packing-chamber, the packing-plates, the packing-band, the gland, the cover of the chamber, and the set-screw for bearing against the gland, substantially as described.

5. The combination of the box having a packing-chamber formed in one end, the cover of the chamber, and the springs W, for supporting the weight of the cover, substantially as specified.

In testimony whereof we affix our signatures in presence of two witnesses.

GEORGE W. BEMIS, Sr.
THOS. BEMIS.

Witnesses:
JOHN W. ROBERTS,
JOHN WAHL.